(12) United States Patent
Rajkumari et al.

(10) Patent No.: US 8,151,147 B2
(45) Date of Patent: Apr. 3, 2012

(54) SYNCHRONIZE ERROR HANDLING FOR A PLURALITY OF PARTITIONS

(75) Inventors: Anurupa Rajkumari, Round Rock, TX (US); Andrew C. Walton, Rocklin, CA (US); Howard Calkin, Davis, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 180 days.

(21) Appl. No.: 12/640,971

(22) Filed: Dec. 17, 2009

(65) Prior Publication Data

US 2011/0154128 A1 Jun. 23, 2011

(51) Int. Cl.
*G06F 11/00* (2006.01)
(52) U.S. Cl. ................. 714/48; 714/2; 714/4.3
(58) Field of Classification Search ...... 714/48
See application file for complete search history.

(56) References Cited

U.S. PATENT DOCUMENTS

| | | | |
|---|---|---|---|
| 2003/0131279 A1* | 7/2003 | Hack et al. ................ 714/7 |
| 2004/0199832 A1* | 10/2004 | Powers et al. ............. 714/48 |
| 2004/0205413 A1* | 10/2004 | Arbeitman et al. ......... 714/39 |
| 2006/0242471 A1* | 10/2006 | Vadnais et al. ............ 714/47 |
| 2006/0281630 A1* | 12/2006 | Bailey et al. ............. 502/200 |
| 2008/0126780 A1* | 5/2008 | Rajkumari et al. ......... 713/2 |
| 2008/0163239 A1* | 7/2008 | Sugumar et al. ........... 718/105 |
| 2008/0222338 A1* | 9/2008 | Balasubramanian et al. 710/306 |
| 2008/0235454 A1* | 9/2008 | Duron et al. ............. 711/128 |
| 2008/0256501 A1* | 10/2008 | Armstrong et al. ......... 716/7 |
| 2009/0013147 A1* | 1/2009 | Kondajeri et al. ......... 711/173 |
| 2010/0011257 A1* | 1/2010 | Murakami ................. 714/48 |
| 2010/0100776 A1* | 4/2010 | Murakami ................. 714/57 |
| 2010/0125845 A1* | 5/2010 | Sugumar et al. ........... 718/1 |
| 2011/0138219 A1* | 6/2011 | Walton et al. ............ 714/3 |

* cited by examiner

*Primary Examiner* — Scott Baderman
*Assistant Examiner* — Chae Ko

(57) ABSTRACT

In accordance with at least some embodiments, a system comprises a plurality of partitions, each partition having its own error handler. The system further comprises a plurality of resources assignable to the plurality of partitions. The system further comprises management logic coupled to the plurality of partitions and the plurality of resources. The management logic comprises an error management tool that synchronizes operation of the error handlers in response to an error.

20 Claims, 2 Drawing Sheets

SYNCHRONIZE ERROR HANDLING FOR A PLURALITY OF PARTITIONS

BACKGROUND

As computer system processing capacity increases, partitionable computer systems have emerged as a desirable solution providing flexibility and security. In a partitionable computer system, the computer's resources are "carved" into a plurality of environments, each isolated from the others. Each partition, for example, may be configured to support a particular operating system and applications supported by the operating system. By dividing the computer's resources into a plurality of partitions, a greater degree of flexibility is attained since different operating systems and applications can operate on different partitions. At the same time, each partition is protected in the event that another partition is corrupted or fails. The isolation between partitions which results in flexibility and ensures robust security, however, makes error handling and recovery difficult. In particular, error handling and recovery can be difficult for errors on shared resources across partitions.

BRIEF DESCRIPTION OF THE DRAWINGS

For a detailed description of exemplary embodiments of the invention, reference will now be made to the accompanying drawings in which.

NOTATION AND NOMENCLATURE

Figure 1:
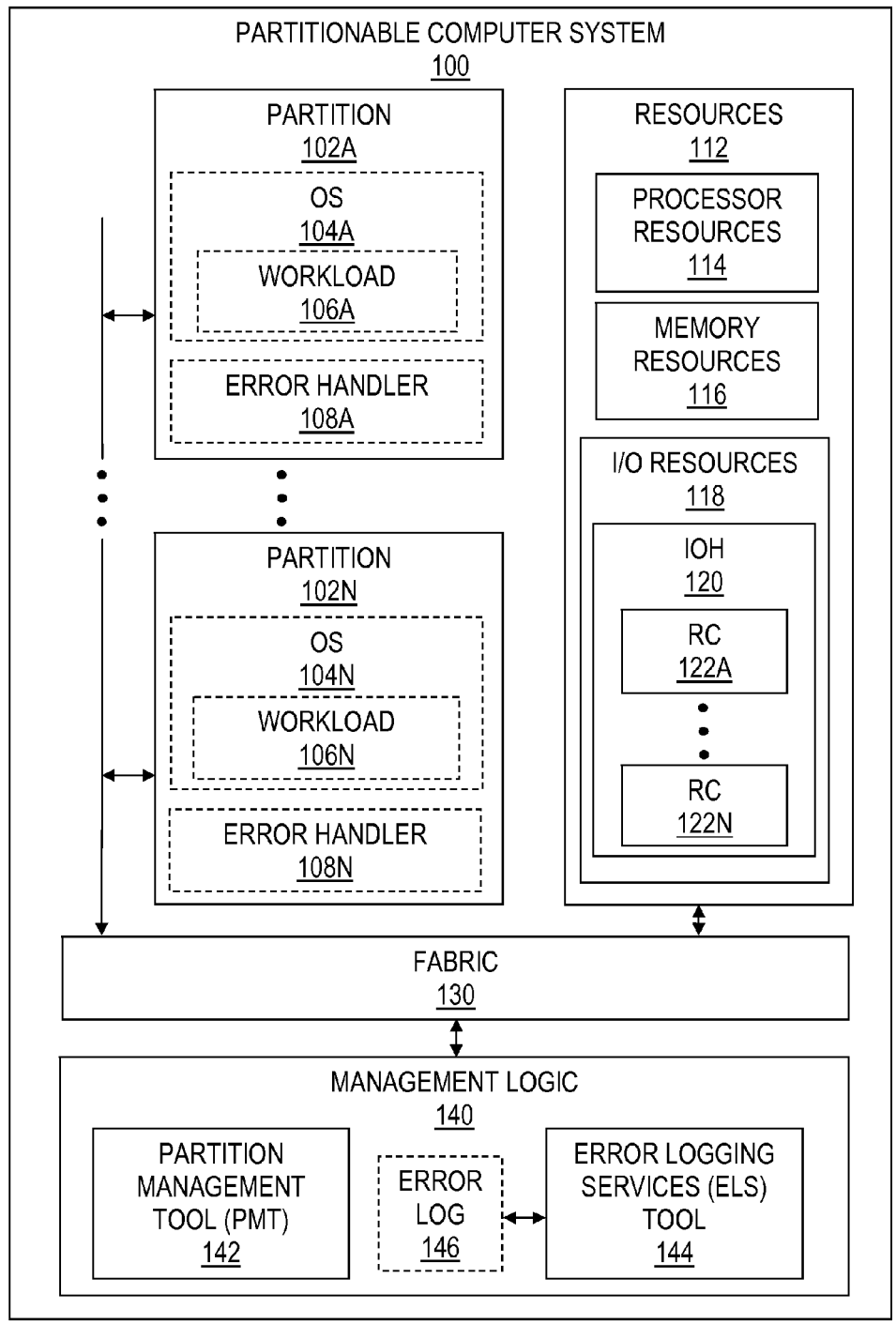
FIG. 1 illustrates a partitionable computer system in accordance with an embodiment of the disclosure.

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect, direct, optical or wireless electrical connection. Thus, if a first device couples to a second device, that connection may be through a direct electrical connection, through an indirect electrical connection via other devices and connections, through an optical electrical connection, or through a wireless electrical connection.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Error containment is often a necessary part of computer systems. For example, in some high-end server designs, when part of a server detects corrupted data, the server will enter a viral mode that causes packets flowing between server components to also enter into a viral mode. As used herein, "viral mode" refers to situations where every end point for packets (e.g., CPUs, memory, and I/O) that receives a corrupted packet (a viral packet) starts marking all emitted packets emitted as viral. Different server components may have different viral mode operations. For example, when a processor (e.g., a central processing unit or "CPU") detects a viral error, the CPU will perform machine-check abort (MCA) operations. Meanwhile, when a root port (RP) in a root complex (RC) in an input/output hub (IOH) detects a viral packet, the RP will enter a containment mode that shuts down I/O operations to prevent corrupted data from being transmitted to disks or to the network.

In response to a viral error, a cleanup process may be performed by the server, by each partition of the server, or by each partition affected by the viral error. In at least some embodiments, the cleanup process includes the steps:

1) A viral error is detected and the detector becomes viral;
2) As packets flow through the system, packet end points (e.g., CPUs, memory controllers and IOHs) that receive viral packets also become viral;
3) Since the fabric blocks packets between partitions, viral errors are contained in the partition that detected the viral error;
4) CPUs that MCA as a result of viral packets execute a firmware MCA handler;
5) Firmware MCA handler code reads from all of the CPUs (and memory controllers if those are separate chips) and I/O to make sure that viral packets are detected;
6) Once firmware is sure that everything in the partition is viral, the firmware programs all of the viral entities to mask viral errors;
7) Now that the viral entities can no longer become viral (any new viral errors are masked), firmware clears the viral mode bit in each chip;
8) The chips stop sending viral packets as firmware clears viral errors and chips that are cleared do not re-enter viral mode even if a viral packet is received because viral errors are being masked;
9) Once all of the chips have viral mode masked, the chips wait for all in-flight transactions that might have been transmitted during a viral mode to reach their destination;
10) After the delay, the firmware MCA handler re-enables viral errors in the chips;
11) The firmware MCA handler hands off to the OS MCA handler;
12) The OS MCA handler dumps the OS state and memory contents to disk for debugging; and
13) The OS reboots.

In at least some embodiments, an IOH is shared with multiple partitions. Thus, if the IOH becomes viral, it will affect the partitions that are sharing it. If firmware was to clean up viral errors in one of the partitions using the above sequence, without regarding the state of the other partitions, the other partitions might still be in viral mode when the viral errors are re-enabled (step 10 above). Because the IOH is shared, if the cleanup process in not synchronized, the viral mode of the other partitions would appear as a nested MCA to the firmware and thus the firmware will reset rather than handoff to the OS because the firmware would assume that the hardware is unhealthy. In accordance with at least some embodiments, another step is added between steps 9 and 10 in the cleanup process described above. During this intermediate step, the firmware uses registers (or other logic) that all of the partitions can see so that all of the partitions know when they have reached the point where they are ready to re-enable viral errors. When the last partition using the IOH indicates that firmware is ready to re-enable viral errors, the firmware will re-enable viral errors and each partition will resume independent operation. Re-enabling viral errors in this manner prevents a hardware problem that caused the original error from causing the OS MCA handler to hang or to have problems completing. In the above technique, a second MCA in the OS MCA handler is taken and a reset occurs instead of handing off to the OS a second time.

To summarize, system processor firmware on a hard partition is unaware (or at least is not sufficiently aware) of events happening on other hard partitions. Techniques such as those described herein enable MCA handling/cleanup across hard partitions. Without such techniques, system firmware cannot handoff successfully to the OS without crashing again (e.g., due to nested MCA events).

FIG. 1 illustrates a partitionable computer system 100 in accordance with an embodiment of the disclosure. As shown in FIG. 1, the partitionable computer system 100 comprises a plurality of partitions 102A-102N, each having its own operating system (OS) 104A-104N and workload 106A-106N. Each of the workloads 106A-106N may correspond to one or more applications executed on a particular OS using a portion of resources 112, which may correspond to processing resources 114, memory resources 116 and input/output (I/O) resources (e.g., ports) 118. If desired, the partitionable computer system 100 is able to execute applications for different OSes by maintaining at least one partition for each OS. In accordance with at least some embodiments, the I/O resources 118 comprises an I/O hub (IOH) 120 having a plurality of root complexes (RCs) 122A-122N that may be allocated to different partitions. In other words, different partitions may share the IOH 120.

In FIG. 1, the partitions 102A-102N are accessible to the resources 112 and to management logic 140 via a fabric 130. The fabric 130 comprises configurable hardware (e.g., switches and other interconnection logic) to selectively associate the resources 112 with different partitions and to selectively interconnect the resources 112 for use by different partitions. In accordance with at least some embodiments, the number of partitions and the resources 112 assigned to each partition is controlled by the management logic 140. Further, the management logic 140 may control error recovery synchronization for the partitionable computer system 100. For example, in FIG. 1, the management logic 140 comprises a partition management tool (PMT) 142 to manage partitions and an error logging services (ELS) tool 144 to manage error recovery synchronization. In accordance with at least some embodiments, the management logic 140 comprises at least one management processor and the PMT 142 and the ELS tool 144 comprise firmware executed by the management processor(s) to provide the management logic 140 some or all of the functionality described herein as attributed to the management logic 140.

In FIG. 1, the partitions 102A-102N correspond to logical divisions. In other words, the partitions 102A-102N and the partitionable computer system 100 are not limited to any particular physical embodiment. In one embodiment, the partitionable computer system 100 may correspond to a server computer configured to organize the partitions 102A-102N. In this embodiment, the server computer comprises processing resources, memory resources, partition software, and the management logic 140 to organize the logical partitions 102A-102N; however, the resources 112 that enable each partition to operate on a workload are provided by hardware separate from the server computer. For example, the resources 112 may correspond to a plurality of blade servers. In some embodiments, each blade server comprises processing resources 114, memory resources 116 and I/O resources 118. Further, each of the partitions 102A-102N is assigned at least one blade server. In other words, resources 112 are assigned at a per-blade level. In alternative embodiments, resources 112 may be selectively assigned at smaller levels or greater levels than a per-blade level. Further, in some embodiments, not all blade servers have the same amount of processing resources 114, memory resources 116 and I/O resources 118. In alternative embodiments, all components of the partitionable computer system 100 are housed within a single chassis. Further, in alternative embodiments, the partitions 102A-102N may be virtualized as is understood in the art.

As shown in FIG. 1, each of the partitions 102A-102N has a respective error handler 108A-108N. As an example, each error handler may correspond to a machine-check abort (MCA) handler. In accordance with at least some embodiments, the ELS tool 144 synchronizes operation of the error handlers 108A-108N in response to an error. For example, the ELS tool 144 may keep track of all the active partitions in the partitionable computer system 100. When an error event occurs (e.g., in the IOH 120), the error may crash one or more partitions. The first partition to be aware of the error event will then check on the other active partitions via the ELS tool 144. If needed, the error handler of a given partition (e.g., the partition that first detects an error) initiates error recovery in the other active partitions via the ELS tool 144. As part of the error recovery process, the error handler for each active partition performs error logging and cleanup for its respective partition. Further, the error handlers involved wait on each other for IOH cleanup and recovery. In some embodiments, the ELS tool 144 enables the IOH cleanup and recovery process to reset the active partitions together. In this manner, confusion regarding error detection and error handling among remote partitions is avoided.

In accordance with at least some embodiments, the ELS tool 144 coordinates generating a combination error log 146 for all partitions when there is an error detected for any of the partitions. Further, the ELS tool 144 may provide the combination error log 146 to all the partitions or otherwise enable the partitions to access the error logic 146. With the combination error log 146, the active partitions are able to avoid confusion regarding previously detected errors and new errors that may occur.

Figure 2:
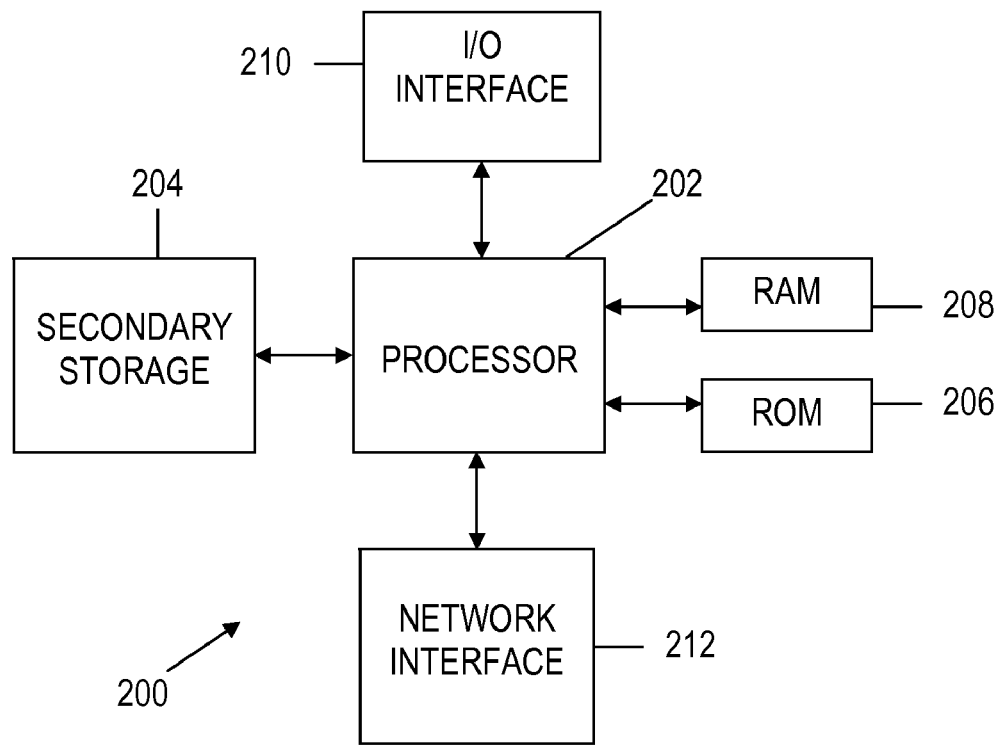
FIG. 2 illustrates a computer system in accordance with an embodiment of the disclosure.

Without limitation to other embodiments, the partition management and error management technique described for FIG. 1 may be implemented on a general-purpose computer or server. FIG. 2 illustrates a computer system 200 in accordance with embodiments. The computer system 200 includes a processor 202. It should be appreciated that processor 202 may be at least one of a variety of processors such as, for example, a microprocessor, a microcontroller, a central processor unit (CPU), a main processing unit (MPU), a digital signal processor (DSP), an advanced reduced instruction set computing (RISC) machine, an (ARM) processor, etc. The processor 202 executes coded instructions which may be present in a main memory of the processor 202 (e.g., within random-access memory (RAM) 208) and/or within an on-board memory of the processor 202. RAM 208 may be correspond to dynamic RAM (DRAM), synchronous dynamic RAM (SDRAM), and/or any other type of RAM device. The processor 202 also communicates with a secondary storage 204 and a read-only memory (ROM) 206 as needed.

To facilitate communication with other devices the processor 202 couples to an input/output (I/O) interface 210 and a network interface 212. As an example, the I/O interface 210 can be used to interface with devices such as a keyboard, a touchpad, buttons, a keypad, switches, dials, a mouse, a trackball, a card reader, a liquid crystal display (LCD), a printer, a touch screen display, a light-emitting diode (LED), or other devices. Meanwhile, the network interface 212 may support medium access controller (MAC) layer functions and physical (PHY) layer functions. The network interface 212 supports wired and/or wireless communications.

The secondary storage 204 is typically comprised of one or more disk drives or tape drives and is used for non-volatile storage of data and as an over-flow data storage device if RAM 208 is not large enough to hold all working data. Secondary storage 204 may be used to store programs that are loaded into RAM 208 when such programs are selected for execution. The ROM 206 is used to store instructions and perhaps data that are read during program execution. ROM 206 is a non-volatile memory device that typically has a small memory capacity relative to the larger memory capacity of secondary storage 204. The RAM 208 is used to store volatile data and perhaps to store instructions. Access to both ROM 206 and RAM 208 is typically faster than to secondary storage 204.

In accordance with embodiments, the computer system 200 implements the partition management and error recovery synchronization technique described for FIG. 1 by executing partition error synchronization software (e.g., the ELS tool 144) stored on a computer-readable storage medium. The computer-readable storage medium may correspond to volatile memory (e.g., RAM 208), non-volatile memory (e.g., ROM 208, secondary storage 204), or both. In such embodiments, execution of the partition error synchronization software causes the processor 202 to detect an error in a resource shared by a plurality of partitions and to synchronize operation of error handlers for each of the plurality of partitions in response to the error. As an example, the error may be detected in an IOH with a plurality of root complexes assignable to different partitions. In some embodiments, execution of the partition error synchronization software causes the processor 202 to synchronize operation of MCA handlers for each of the plurality of partitions in response to the error. Further, execution of the partition error synchronization software may cause the processor 202 to direct each error handler to perform error logging and cleanup and then to wait for IOH cleanup and recovery. Further, execution of the partition error synchronization software may cause the processor 202 to coordinate generating an error log (e.g., error log 146) for all active partitions when there is an error detected for any of the active partitions. In some embodiments, execution of the error management software causes the processor 202 to provide a copy of the error log to all of the active partitions. Alternatively, execution of the error management software enables all of the active partitions to access the error log or a copy of the error log. With access to the error log, the active partitions are able to avoid confusion regarding previously detected errors and new errors that may occur.

Figure 3:
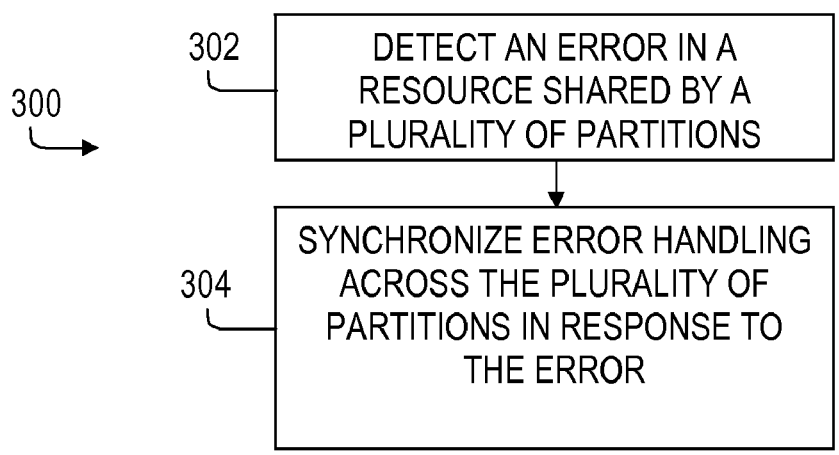
FIG. 3 illustrates a method for partition error synchronization in accordance with an embodiment of the disclosure.

FIG. 3 illustrates a method 300 for partition error synchronization in accordance with an embodiment of the disclosure. As shown in FIG. 3, the method 300 comprises detecting an error in a resource shared by a plurality of partitions (block 302). As an example, the error may be detected by an IOH with a plurality of root complexes assignable to different partitions. The method 300 further comprises synchronizing error handling across the plurality of partitions in response to the error (block 304). In some embodiments, synchronizing error handling across the plurality of partitions comprises directing each partition to perform error logging and cleanup and then to wait for IOH cleanup and recovery. As an example, the error logging and cleanup for each partition may be performed by respective MCA handlers.

In some embodiments, the method 300 may comprise additional steps that are added individually or in combination. For example, in some embodiments, the method 300 may additionally comprise coordinating generation of an error log (e.g., error log 146) for all active partitions when there is an error detected for any active partitions. Further, the method 300 may additionally comprise providing the error log to all active partitions to avoid confusion regarding previously detected errors and new errors that may occur. In various embodiments, the method 300 may be performed by a processor that executes partition error synchronization software as described for FIG. 2. As a specific example, the method 300 may be performed by a management processor that executes the ELS tool 144 described for FIG. 1.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A system, comprising:
   a plurality of partitions, each partition having its own error handler;
   a plurality of resources assignable to the plurality of partitions; and
   management logic accessible to the plurality of partitions and the plurality of resources,
   wherein the management logic comprises an error management tool that synchronizes operation of the error handlers in response to an error, synchronization comprising re-enabling, based on a combination error log that logs errors for each partition, recognition of viral errors for a partition only after each partition is cleaned.

2. The system of claim 1 wherein the error occurs in a resource shared by a plurality of the partitions.

3. The system of claim 1 wherein each error handler comprises a machine-check abort (MCA) handler.

4. The system of claim 1 wherein the plurality of resources comprises an input/output hub (IOH) with a plurality of root complexes assignable to different partitions.

5. The system of claim 4 wherein the management logic synchronizes operation of the error handlers in response to an IOH error.

6. The system of claim 5 wherein the error management tool causes each error handler to perform error logging and cleanup and then to wait for IOH cleanup and recovery.

7. The system of claim 1 wherein the error management tool comprises an error logging services tool that coordinates generating an error log for all partitions when there is an error detected for any of the partitions.

8. The system of claim 7 wherein the error management tool provides the error log to all the partitions.

9. A computer-readable storage medium comprising partition error synchronization software that, when executed, causes a processor to:
   detect an error in a resource shared by a plurality of partitions; and
   synchronize operation of error handlers for each of the plurality of partitions in response to the error, synchronization comprising re-enabling, based on a combination error log that logs errors for each partition, recognition of viral errors for a partition only after each partition is cleaned.

10. The computer-readable storage medium of claim 9 wherein the partition error synchronization software further causes the processor to synchronize operation of machine-check abort (MCA) handlers for each of the plurality of partitions in response to the error.

11. The computer-readable storage medium of claim 9 wherein the partition error synchronization software further causes the processor to detect an error in an input/output hub (IOH) with a plurality of root complexes assignable to different partitions.

12. The computer-readable storage medium of claim 11 wherein the partition error synchronization software further causes the processor to direct each error handler to perform error logging and cleanup and then to wait for IOH cleanup and recovery.

13. The computer-readable storage medium of claim 9 wherein the partition error synchronization software further causes the processor to coordinate generating an error log for all of said partitions when there is an error detected for any of said partitions.

14. The computer-readable storage medium of claim 13 wherein the partition error synchronization software further causes the processor to provide the error log to all of said partitions.

15. A method, comprising:
detecting, by a processor, an error in a resource shared by a plurality of partitions; and
synchronizing error handling, by the processor, across the plurality of partitions in response to the error, synchronization comprising re-enabling, based on a combination error log that logs errors for each partition, recognition of viral errors for a partition only after each partition is cleaned.

16. The method of claim 15 wherein said synchronizing error handling across the plurality of partitions comprises synchronizing operation of a machine-check abort (MCA) handler for each of said partitions.

17. The method of claim 15 wherein said detecting an error in a resource shared by a plurality of partitions comprises detecting an error in an input/output hub (IOH) with a plurality of root complexes assignable to different partitions.

18. The method of claim 17 wherein said synchronizing error handling across the plurality of partitions comprises directing each partition to perform error logging and cleanup and then to wait for IOH cleanup and recovery.

19. The method of claim 15 further comprising coordinating generation of an error log for all of said partitions when there is an error detected for any of said partitions.

20. The method of claim 19 further comprising providing the error log to all of said partitions.

\* \* \* \* \*